United States Patent Office

3,412,299
Patented Nov. 19, 1968

3,412,299
ADAPTIVE CONTROL SYSTEM AND METHOD
Richard G. Buscher, Vestal, and Glenn W. Walker, Endicott, N.Y., assignors to General Electric Company, a corporation of New York
Filed Mar. 26, 1964, Ser. No. 355,042
4 Claims. (Cl. 318—18)

ABSTRACT OF THE DISCLOSURE

Improvement in self-adaptive control systems. A measurement of the requirement to raise or lower the gain of a feedback control system is made by sensing the damping of one mode of a systems response. The circuit includes a filter network passing the mode of response to be measured, an integrator to measure successive half-cycles, the ratio of which is proportional to damping of the selected mode, an area comparator to determine the error from the desired damping, a memory circuit and a gain changer to change the gain of the feedback system.

---

This invention relates to an improvement in self-adaptive control systems and methods of automatic control. It is particularly useful in flight control systems where it is necessary to accurately vary the feedback gains in the feedback loops to compensate for changes in vehicle dynamics and changes in their environmental conditions.

Figure 1:
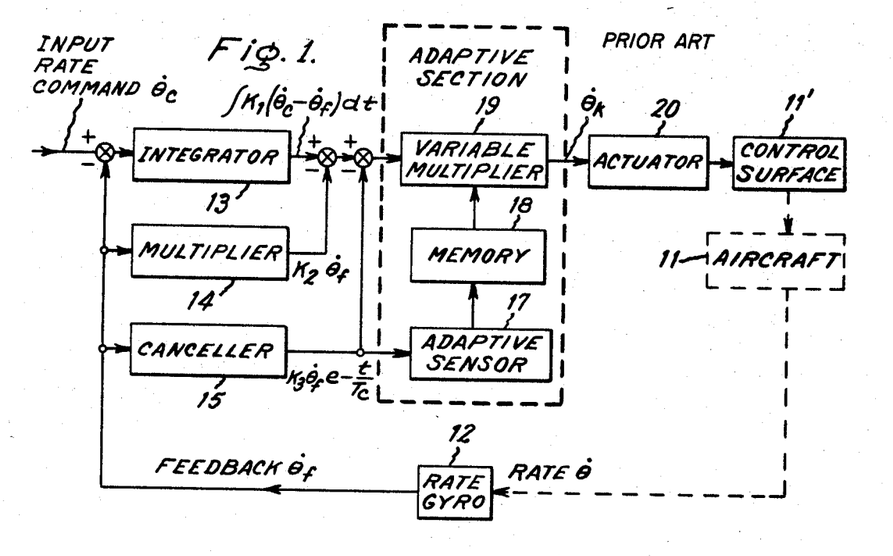
FIGURE 1 is a block diagram of a prior art self-adaptive flight control channel and FIGURE 1A is a partial root locus plot illustrating operation.

A successful self-adaptive control system is illustrated by the prior art pitch channel of FIGURE 1. In response to a pilot control stick movement, or other command source, an aircraft 11 is controlled in pitch rate $\theta$, in accordance with an input rate command signal $\theta_c$ and a degenerative feedback signal $\theta_f$ derived by a rate gyro 12. Actuator 20 positions the aircraft control surface 11' so that the pitch rate $\theta$ of aircraft 11 follows the input signal $\theta_c$. The particular signal processing configuration for stability augmentation incorporates integrator 13 which integrates the error signal derived from $\theta_c - \theta_f$ and also introduces the selected fixed gain factor $K_1$. The integrated error signal $\theta_c - \theta_f$ is augmented by signals derived from the feedback signal $\theta_f$ by means of parallel multiplier 14 and "canceller" 15. This signal processing is adjusted to produce the desired airplane response characteristics in accordance with conventional servo design by selecting the appropriate nominal values for the constants $K_1$, $K_2$, $K_3$ and $T_c$. The system is made self-adaptive by means of the variable gain changer 19 which is adjusted by integrator memory 18 in accordance with variations in the system natural frequency response due to changes in environment, aircraft parameters, etc. For further details of this system, reference is made to the Proceedings of the 1961 Western Electronic Show and Convention (WESCON) "Self Adaptive Control Through Frequency Regulation" by R. G. Buscher, K. B. Haefner, and M. F. Marx.

The adaptive sensor 17 monitors the damped natural frequency $\omega_d$ of the adaptive mode. This is done by measuring the time interval between the zero crossings of the time varying signal. The time measured is compared to a reference time interval. This reference time is the period associated with some desired damped natural frequency. If the measured time interval is less than the reference time, the actual frequency is higher than the desired frequency.

Figure 1A:
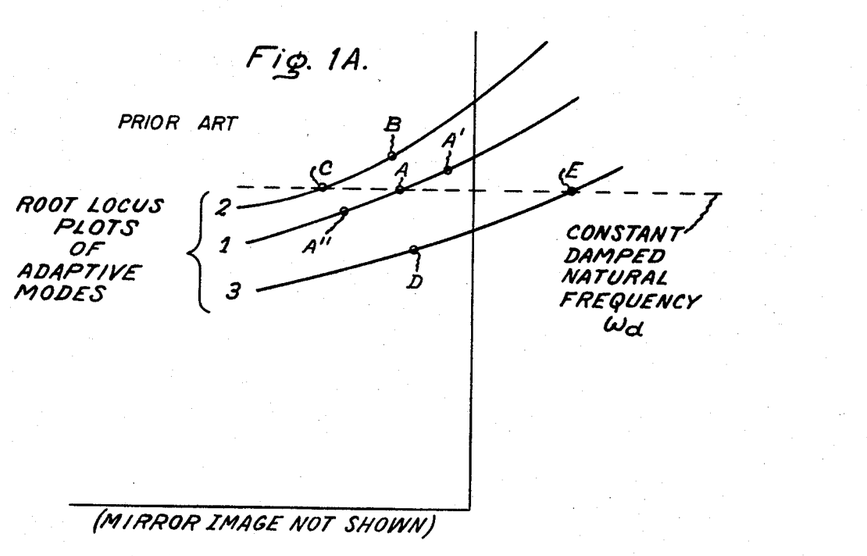

The operation, as seen in the root locus plot of FIGURE 1A, is characterized by a possible system locus 1 having the point A' for the root (for a particular value of gain), which is above the line of constant damped natural frequency, $\omega_d$. This indicates that the system gain is too high. The gain is then reduced to servo the frequency response back to the reference frequency $\omega_d$ at point A. If the root occurs at some point A'', the gain is too low. The gain changer 19 then increases the system gain. The choice of what frequency to use as the reference $\omega_d$ is based on the specific application. The nominal range for this frequency is 2 to 5 c.p.s.

With changes in flight conditions or system characteristics, the locus or mode could change to locus 2 where a root B would be moved to C. Other effects such as the aging of the actuators, in particular, could cause locus 3 to result. The adaptive sensor 17 then operates to cause the mode to have the constant damped natural frequency $\omega_c$. However, in moving the root from D to E, an unstable condition is reached. Considering locus 3 again, another problem can be seen. The gradient of change in $\omega_d$ per change in gain at point D can be much less than around point A on locus 1. This results in sluggish adaption whereby the loop may take too long to adapt. Thus, care must be taken in choosing the desired $\omega_d$, and variations in actuators, the setting of the reference and unexpected flight conditions can cause trouble if adequate margins are not set up. While this can be done, it is at the sacrifice of the range of adaption and the imposition of constraints on the permissible range of system characteristics.

Accordingly, it is an object of the invention to provide a self-adaptive control system which is inherently stable, the adaption process being eliminated as a possible source for introducing instability.

It is another object of the invention to provide a self-adaptive control system which provides a more comprehensive and sensitive response to variation in system dynamics than that provided by direct frequency sensing.

It is a further object to provide flight control system channels having performance characteristics which are largely insensitive to changes in gyro and actuator dynamics.

Briefly stated, in accordance with certain aspects of the invention, a self-adaptive control process is provided which, instead of relying solely on frequency response, senses variations in the damping constants of the system mode having the least phase margin. The signal derived representing damping variation is then utilized to adjust a variable gain changer in the control loop.

The invention, together with further objects and advantages thereof, may best be understood by referring to the following description taken in conjunction with the appended drawings in which like numerals indicate like parts and in which:

Figure 2:
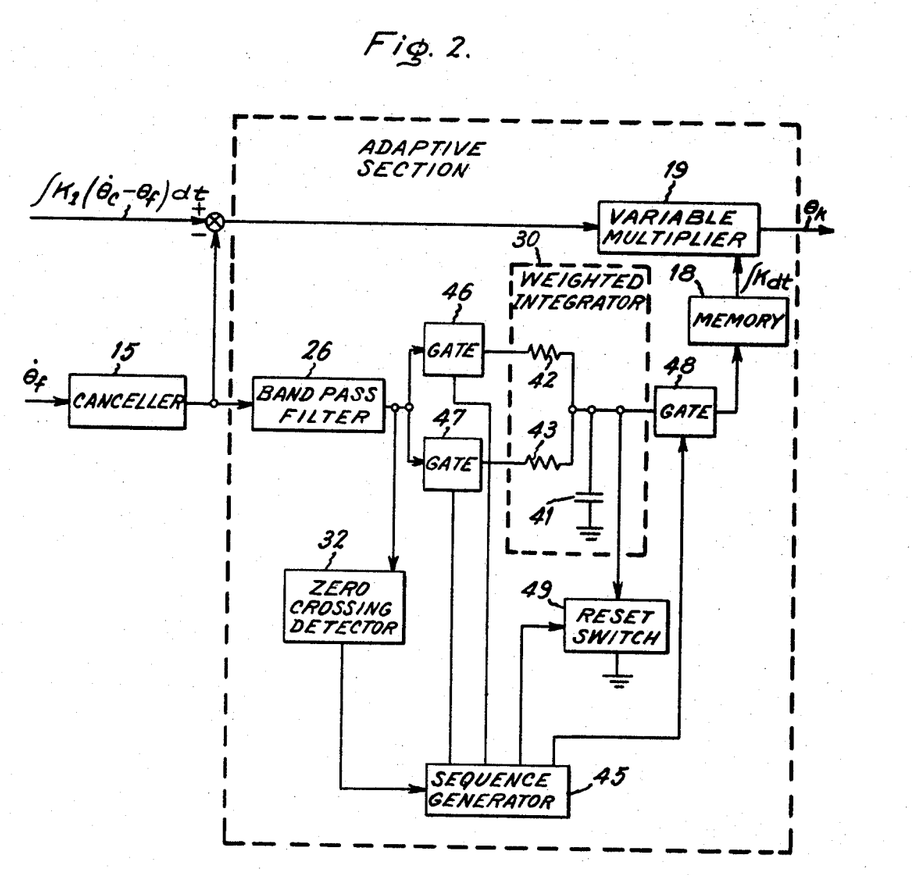
FIGURE 2 is a block diagram of a first embodiment of the novel self-adaptive flight control channel.

The FIGURE 2 embodiment of the novel damping sensor is for use in a flight control system channel such as the FIGURE 1 pitch control channel. The sensor input is derived from the standard canceller 15 by means of a band pass filter 26 which passes signal frequencies in the neighborhood of the desired constant damped natural frequency of the system channel. The filtered signal is then sensed to determine the damping of the system. This is performed by an integrator in the form of capacitor 41 and ratio multipliers in the form of resistors 42 and 43. The sensor derives a damping signal for correction of the variable gain changer 19 in a manner more fully described hereinafter. The damping signal increment is produced each cycle of the filtered canceller signal by comparing the weighted successive integrated half-cycles. Resistors 42 and 43 actually perform two functions, converting the filtered voltage signal to a current signal for integration by capacitor 41 and weighting the signal for the respective half cycles in accordance with the desired weighting ratio $n_r$. The successive half cycles are gated to the respective resistors 42 and 43 under the control of sequence generator 45 and zero-crossing detector 32. Preferably, conventional transistor switches are used for gates 46 and 47, a conventional transistor flip-flop for sequence generator 45 controlling the gates, and the conventional zero-crossing detector 32 triggers the sequence generator. The sequence generator 45 also controls read-out, preferably by means of a one-shot multivibrator responsive to a transient condition of one state of the flip-flop. Read-out of the integrator 30 is gated by the multivibrator by means of gate 48 after alternate half-cycles to memory multiplier 18 which adds a damping signal increment to adjust the variable gain changer 19. Slightly delayed, the multivibrator also momentarily operates reset switch 49 which discharges capacitor 41.

Figure 2A:
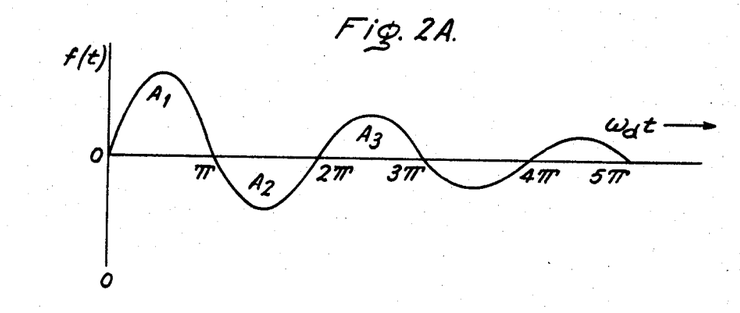
FIGURES 2A and 2B are a graph of a derived response signal and a partial root locus plot, illustrating operation.

The operation of the FIGURE 2 damping sensor can be considered from the following relations. If a quadratic transfer function is considered, its impulse response can be expressed as a function of time by Equation 1 and FIGURE 2A.

$$f(t) = C_1 \epsilon^{\frac{-\delta \omega_d t}{\sqrt{1-\delta^2}}} \sin \omega_d t \quad (1)$$

where $C_1$ is some amplitude coefficient
$\delta$ is the damping
$\omega_d$ is the damped natural frequency
$t$ is time When the expression is integrated between zero crossings ($\omega_d t = 0\pi, 2\pi, 3\pi, \ldots$). The areas $A_1, A_2, A_3 \ldots$ are found. The ratio of $A_2$ to $A_1$ is then determined by the ratio of the integrated functions. In generalized form, this ratio can be expressed by Equation 2.

$$\frac{A_{n+1}}{A_n} = \epsilon^{\frac{-\delta \pi}{\sqrt{1-\delta^2}}} \quad (2)$$

This expression shows that the area ratio is a function of damping alone. Thus the adaption process becomes the simple ratio determination of successive areas. The ratios so obtained are compared to a desired $\delta$ ratio (determined by inserting the desired $\delta$ into Equation 2). If the ratio is too large, the damping is low and the gain should decrease, and conversely if the ratio is too small, the damping is high and the gain should increase.

In order to avoid the problems of dividing the areas to obtain the ratio, a slightly different approach is used. If an area $A_n$ is obtained by integrating the function between zero crossings, the desired area $A_{n+1}$ can be determined by multiplying $A_n$ by $n_R$, where $n_R$ is the ratio found from Equation 2 for the desired damping. The desired $A_{n+1}$ can then be compared to the actual $A_{n+1}$. The difference is a measure of damping error. This can be expressed in equation form by Equation 3.

$$\epsilon = A_{n+1} - n_R A_n \quad (3)$$

where $\epsilon$ is the damping error signal.

Thus the process is reduced to subtraction of successive integrated values of the high frequency mode.

Assume that the input is switched to weighting resistor 42. This allows capacitor 41 to integrate the current due to the high frequency mode. When the next zero crossing occurs, the input is switched off. Capacitor 41 then contains a voltage $V_c$, proportional to $A_n$. Next, the input is switched to weighting resistor 43 such that the current discharges capacitor 41 during the next time interval between zero crossings. At the $n+2$ zero crossing, the voltage $V_c$ will have been reduced by an amount proportional to $A_{n+1}$. The ratio of resistors is set at $n_R$. $V_c$ will then be zero if the ratio of $A_n$ to $A_{n+1}$ is $n_R$.

Thus the process becomes the charging of a capacitor during one time period, discharging during the next time period, then reading and resetting the capacitor.

Figure 2B:
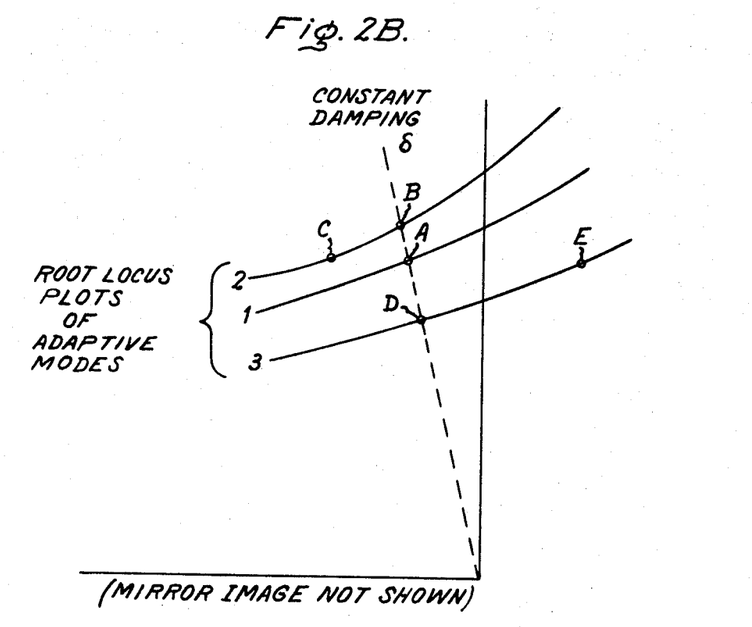

FIGURE 2B is a portion of the root locus plot of the system of FIGURES 1 and 2. It is identical to the FIGURE 1A plot, but shows the use constant damping $\omega_d$ as a reference. The damping sensor will operate to drive the adaptive mode to points A on locus 1, B on locus 2, and D on locus 3. The degree of stability is the same at all three points. The lack of a good frequency gradient in case 3 does not affect the operation of the damping sensor. This indicates that the damping sensor is less affected by unexpected variations in system components or in the flight condition.

One point of concern is the form of the equation used. Since the error, $\epsilon$, is found by substraction, it is a function of amplitude as well as damping. That is, for a given damping change, the value of $\epsilon$ will change with the amplitude of $A_n$ and $A_{n+1}$. This affects the "gain" of the adaptive controller. In other words, how much the gain is changed for a sensed error.

The designer must take care in setting up the system so that the adaptive loop will follow the changes in flight condition. In a sense, the adaptive loop is a servo loop with damping as the controlled variable. As such, it is subject to the same concerns of loop gain, component lags, etc., that must be considered in any other servo loop.

Figure 3:
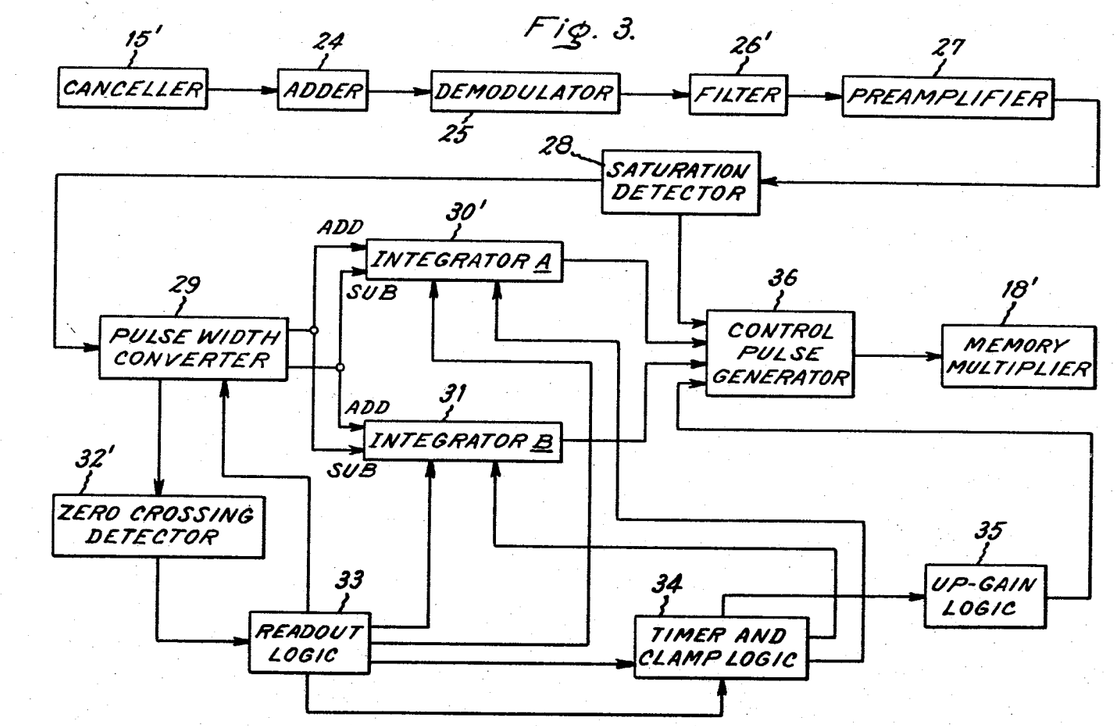
FIGURE 3 is a block diagram of a preferred embodiment of the novel flight control channel.
Figure 3A:
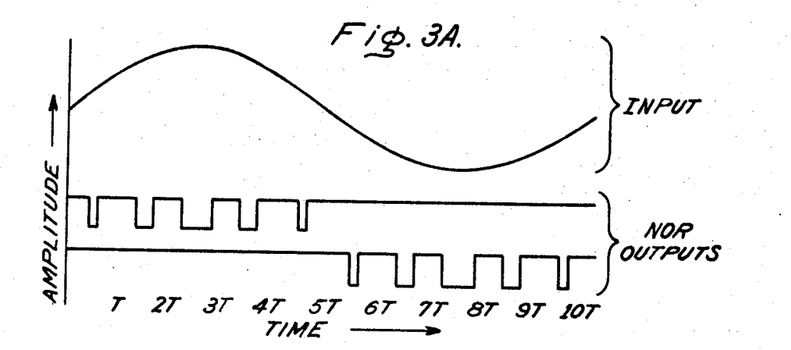
FIGURES 3A–3D are diagrams illustrating its operation and FIGURES 3E–3F comprise a schematic diagram of the FIGURE 3 channel.
Figure 3B:
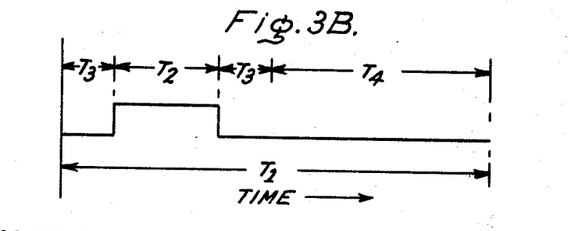

FIGURE 3 is a block diagram of a preferred damping sensor for use in a system utilizing pulse width modulation. The input circuitry shown in the blocks labeled adder 24, demodulator 25, filter 26' and preamplifier 27 are basically pulse width circuits performing the same overall functions as are performed in the system of FIGURES 1 and 2, those blocks which are direct counterparts are represented with same reference characters primed. The next block in the sequence is the saturation detector 28. It has no effect during normal operation of the sensor so further discussion will not be presented at this time. The process for obtaining the area ratio begins in converter 29. The function of this block is to convert the signal filtered to pass the desired mode component into a pulse width modulated form. The adaptive sensor signal is thereby reduced to an on-off type signal and as such, it is now adaptable to processing by digital logic elements. FIGURE 3A shows the input-output signal forms of the pulse width converter. For the purposes of illustration, only five pulse time periods are shown in one half cycle of the adaptive mode. In the actual mechanization there will be typically 40 to 100 depending upon the adaptive mode frequency. An expanded picture of one pulse time period is shown in FIGURE 3B.

The pulse width converter 29 is actually a sampling device. The sampling time, $T_1$, is a fixed time corresponding to one period of the excitation frequency. The ratio of time on $T_2$ to time off $T_3$ is proportional to the analog amplitude of the input at the sampling instant. The reset time $T_4$ puts initial conditions on the pulse width converter. The two outputs of the pulse width converter are for corresponding positive or negative inputs.

Having converted the adaptive sensor signal into pulse width form, the next step is integration. Although there are two integrators 30' and 31, a discussion of one will suffice since the operation of the other is simply 180° out of phase with the first. The reason for two integrators is to double the rate at which error signals are generated. Duplication of integrators is critical to obtaining the maximum self-adaptive response. It enables damping sensing at each zero-crossing in the system response.

Figure 3C:
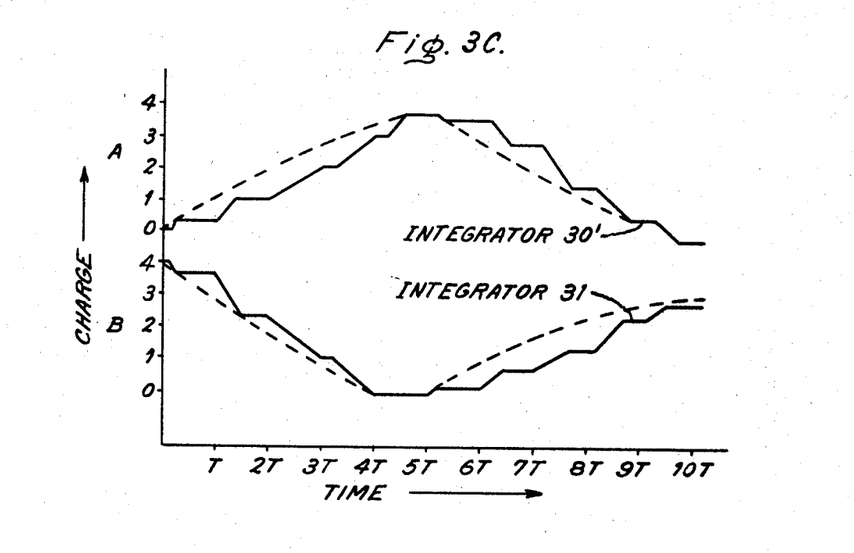

FIGURE 3 shows the integrators have both "add" and "subtract" inputs. FIGURE 3C shows the integrator outputs corresponding to the inputs which are the NOR outputs of FIGURE 3A. The appearance of FIGURE 3C is explained as follows. The output of the pulse width converter 29 (on-time) charges a capacitor 41 in integrator 30 at a given rate since an "add" input is present. The same pulse width converter output appears as a "subtract" input to integrator 31 and thus discharges the integrating capacitor. This integration continues until the polarity of the input is reversed, at which time integrator 30 starts discharging and integrator 31 starts charging. The irregularity of the curve in FIGURE 3C will approach that of the dotted curve as the sampling period is reduced.

Figure 3D:
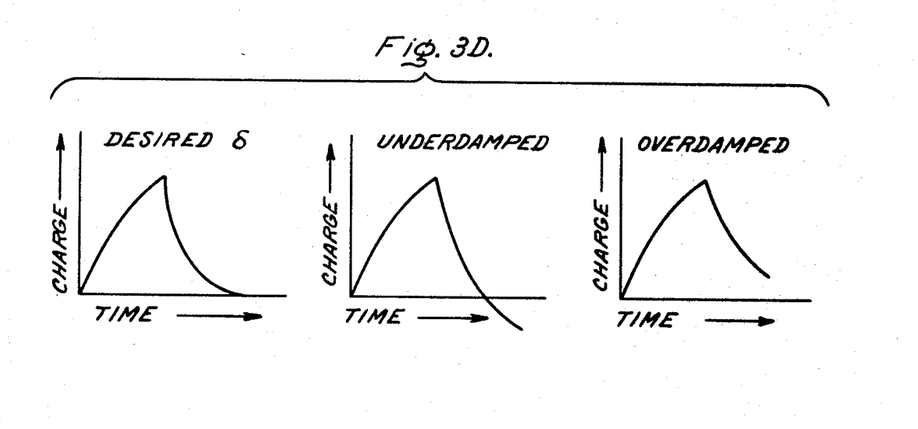
Figure 3E:
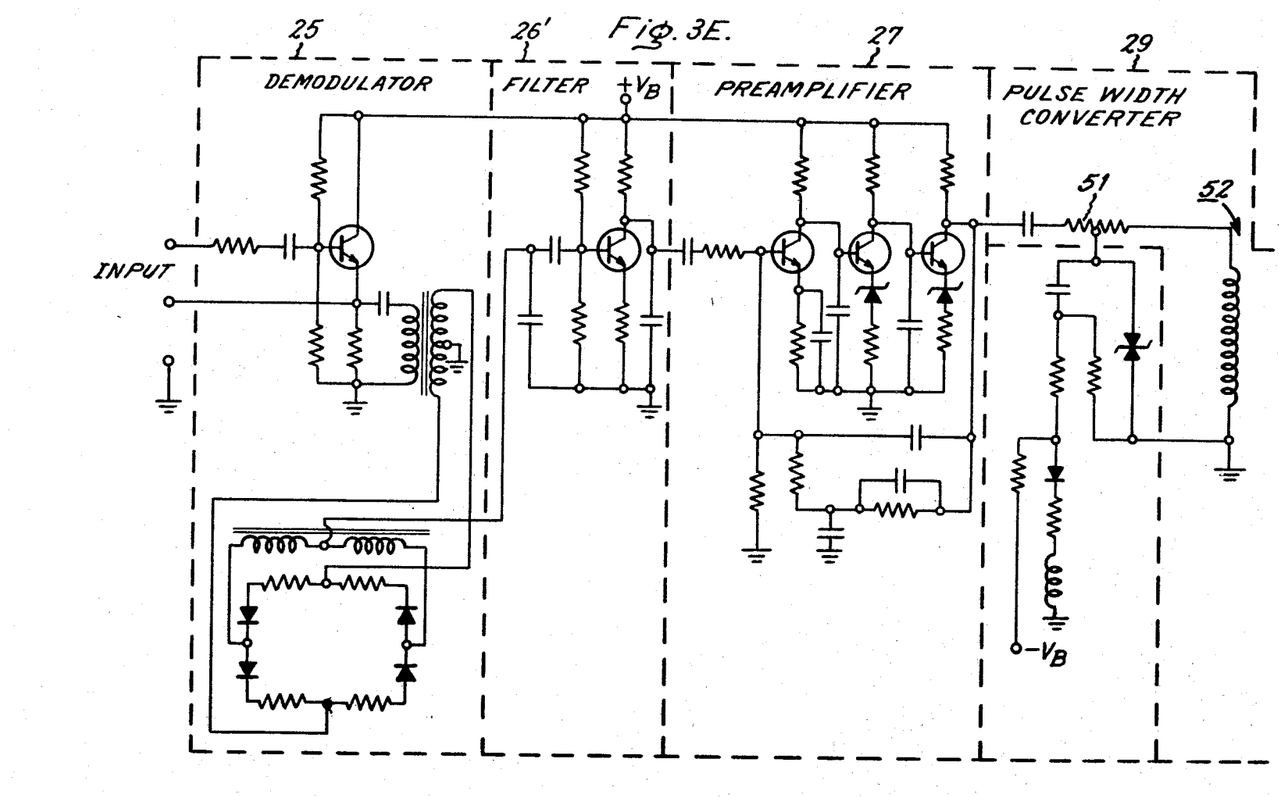

The zero crossing detector 32', readout logic 33, and control pulse generator 36 derive the necessary information from integrators 30' and 31. Refer to the time shown as 5T on FIGURE 3C. At this time the input to the pulse width converter 29 is seen to have reversed (FIGURE 3A). Since a zero crossing has occurred, the readout logic 33 is triggered by the zero crossing detector 32'. The charge (if any) on integrator 31 would be sampled at this time by the control pulse generator 36. Integrator 30' is not sampled until time 10T. FIGURE 3D shows the operation of the integrators for the three situations of system damping which will arise. The control pulse generator 36 adjusts the system gain K through the memory 18' then multiplier 19 as a function of the charge on the integrator at read time.

The timer and clamp logic 34 and the up-gain logic 35 shown in FIGURE 3 are incorporated into the damping sensor to insure against the situation of the system remaining in a condition where the gain is much less than required. If the time between zero crossings exceeds a predetermined time, both integrators are clamped to zero. Any information beyond this time is assumed to be inaccurate. At the next zero crossing a fixed amount of up-gain is introduced through the control pulse generator, and one integrator is released for normal operation. (Provided it occurs within the predetermined time.) At the next zero crossing the other integrator is released but no gain information is available. By the third zero crossing the sensor operation can be back to normal if the adaptive mode has become predominate enough to provide regular information.

Figure 3F:
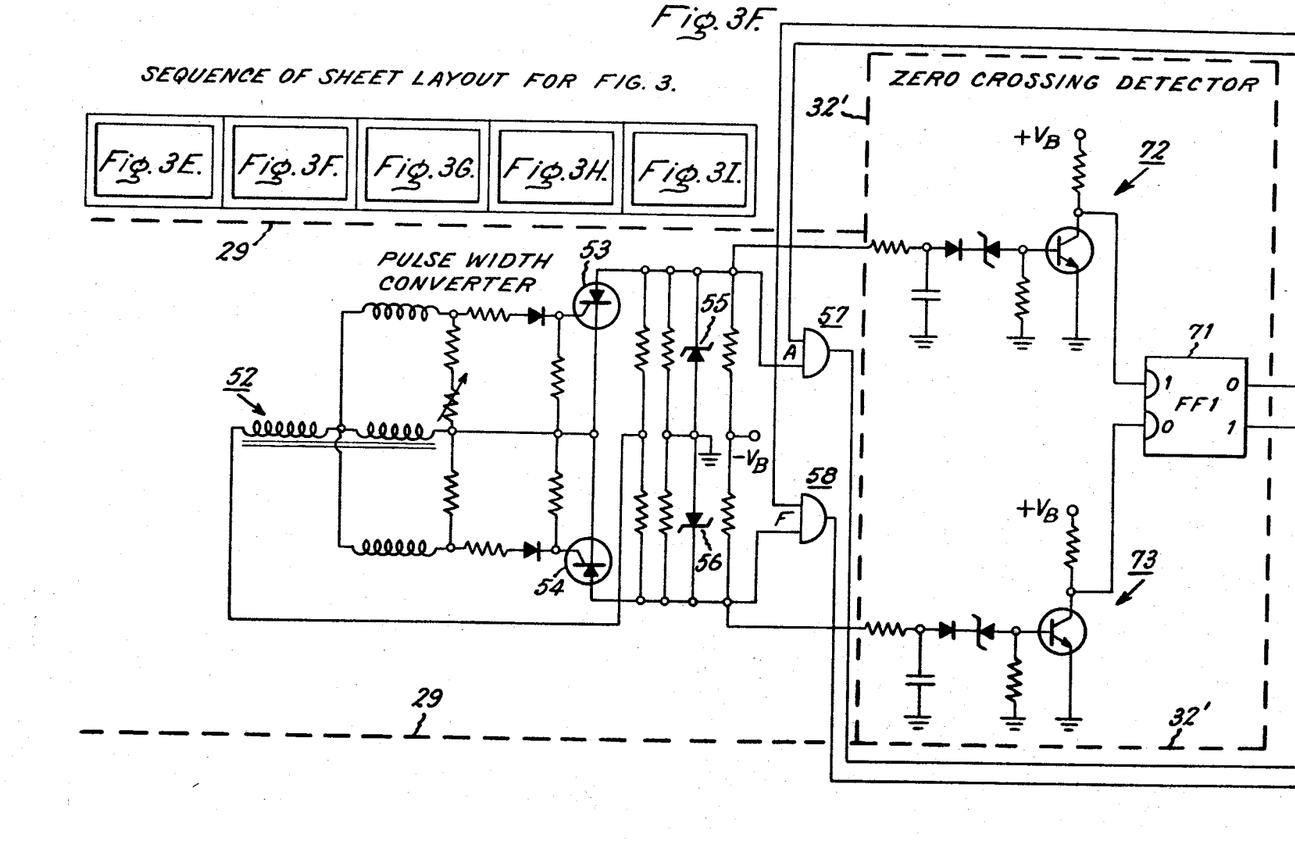

A schematic of the damping sensor circuitry of FIGURE 3 is shown in FIGURES 3E–I. The input circuitry (FIGURE 3E) is composed of the conventional demodulator 25, band pass filter 26' and preamplifier 27. The output of the input circuitry is received by pulse width converter 29 through resistor 51 into a signal winding 52 of a half-wave push-pull magnetic amplifier which "fires" two controlled rectifiers 53 and 54 (FIGURE 3F). Depending on the polarity of the signal into the control winding, the firing angle of one SCR is advanced and the other retarded, producing a pulse-width modulated output. The output level is fixed by Zener diodes 55 and 56.

The pulse widths are proportional to the varying amplitude of the signal received. Therefore, the positive excursion of the adaptive mode is represented by a train of varying pulse widths of fixed amplitude occurring at one output point A, while the negative excursion is represented by a similar train occurring at another output point F. These outputs are fed to the zero crossing detector trigger circuits 32' and two NOR circuits 57 and 58 which drive the integrators 30' and 31.

The inputs to the integrator diodes 61 and 62 (FIGURE 3H) have been converted to pulse width form as previously described and inverted by the NOR circuits. The input at diode 61 will be grounded for each particular pulse width and back biased for all other time. Transistor 63, which is normally biased on, will turn off for each pulse width duration. Each time transistor 63 is turned off the emitter-base diode of transistor 64 is forward biased allowing a constant current to flow in common base connected transistor 64. This will allow capacitor 65 to accumulate charge at a constant rate, effectively, pulse-width-integrating the area of the positive excursion.

Figure 3H:
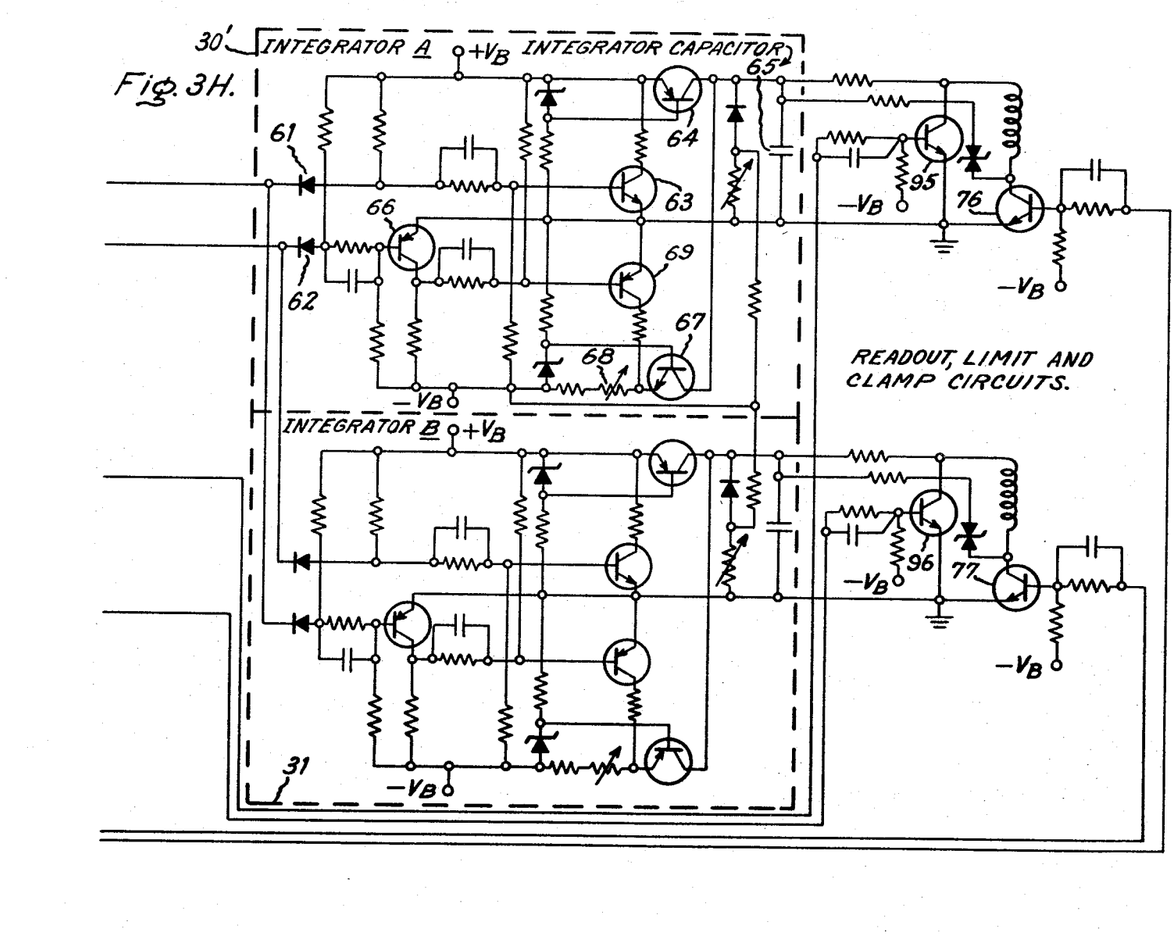

Similarly, inputs to diode 62 will ground it for each particular pulse width and back bias it for all other time. Transistor 66, which is normally biased on will turn off in a similar fashion as transistor 63. As long as transistor 66 is on, transistor 69 is biased on; but when transistor 66 is off, transistor 69 is held off by bias. When transistor 69 is off, the emitter-base diode of transistor 67 is forward biased allowing a constant current to flow in the common base connected transistor 67. This draws off capacitor 65 at a constant rate, effectively, pulse-width-integrating the area of the negative excursion.

By adjusting the setting of potentiometer 68, the discharge rate can be made equal, greater, or less than the charging rate. This setting establishes an area ratio for the integrator. Both integrators should be set with identical area ratios for proper operation. If no charge is left on capacitor 65, the adjacent positive/negative excursions correspond to the fixed area ratio. If a positive charge is left on capacitor 65, the actual area ratio is lower than the desired ratio which indicates an increase in damping, and requires an increase in gain to decrease the damping. If negative charge is left on capacitor 65, the actual area ratio is higher than the desired ratio which indicates a decrease in damping and requires a decrease in gain. By reading out the charge on capacitor 65 through magnetic amplifier 70 the gain is adjusted as required.

The zero crossing detector 32' (FIGURE 3F) is a flip-flop module 71 with independent trigger inputs. The trigger circuits 72 and 73 sense the outputs at points A and F, and set the flip-flop from one state to the other. A change of trigger pulse from A to F (or F to A) indicates a change in polarity and hence a zero-crossing.

When flip-flop 71 changes states, either one of the two single shot multivibrators 74 and 75 (FIGURE 3G) is triggered on. The single shots are triggered at alternate zero crossings and provide a turn on signal to the bases of the readout transistor switches 76 and 77.

The timer circuit 34 is controlled by the single shots turning on and off. Either single shot turning off will trigger the timer on, and conversely either single shot turning on will trigger an OR gate which resets the timer by pulling the collector of 78 to ground through 79. Two other functions of the OR gate are to trigger the up-gain single shot when the gate (resistor 80-diode 81) is enabled and provide an input to the "set to clamp" NOR 82.

The final function of the single shots 74 and 75 is to keep the clamp control in the release position during normal operation and to release the clamps in proper order after clamping action takes place.

Readout of the charge left on capacitor 65 (FIGURE 3H) is accomplished by turning on series switch 76. This discharges 65 to ground. The switches are controlled by the single shots as previously described. The switch requires enough base drive to enable it to be bilateral (switch current in either direction).

The timer is a single shot multivibrator 83 which is triggered on by either readout single-shot going off. If it is not reset before timing out, it will trigger the "set to clamp" NOR 82 (thus clamp capacitor 65) and will enable the resistance/diode gate 80, 81 allowing capacitor 85 to charge. The next zero-crossing will trigger the up-gain single-shot 88.

The clamp control consists of two flip-flop modules 91 and 92 which normally hold buffers 93 and 94 on, thus holding clamp switches 95 and 96 off. When the "set to clamp" NOR 82 has two positive inputs (when the timer has timed out and no zero-crossing has occurred), the NOR will "pull chain" the collectors of 91 and 92, which control the buffers, to ground. This turns 93 and 94 off and holds them off, thus turning on the clamps 95 and 96. The next zero-crossing will release one clamp by "pull chaining" the other collector of the flip-flop to ground. Likewise the next zero crossing will release the other clamp. The third zero crossing after clamping will be a normal readout cycle.

The clamp circuit performs the task of shunting the integrating capacitors to ground when the period between zero crossings is too long. This is accomplished by turning on the normally off switches 95 and 96. Both clamps are simultaneously turned on by the clamp control. The switch requires enough base drive to enable it to be bilateral.

Figure 4:
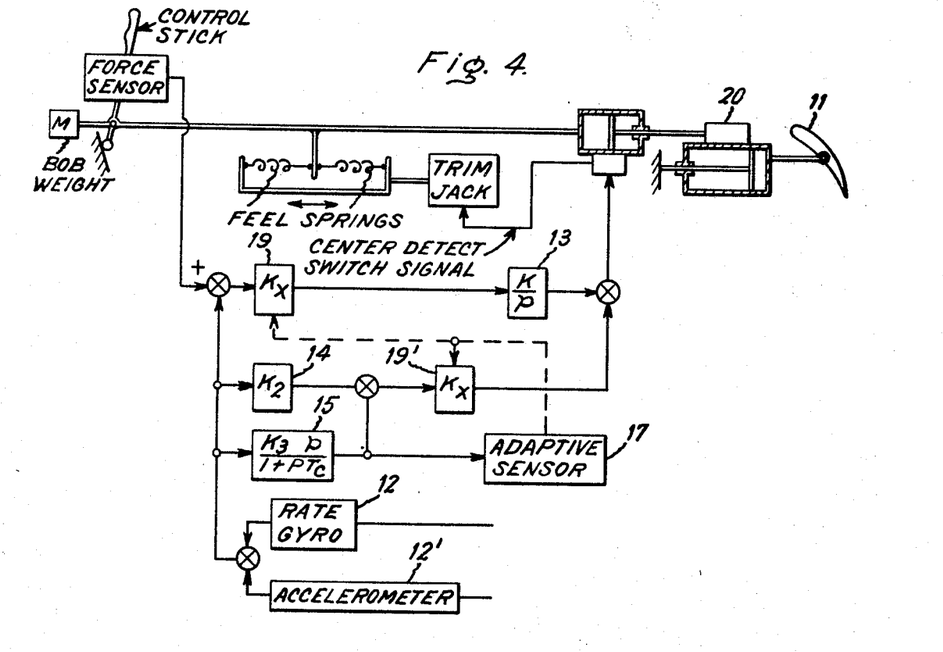
FIGURE 4 is a representative alternative flight control channel configuration.

FIGURE 4 illustrates a representative alternative control system which incorporates the present invention. It provides a series-parallel type of control action in respect to the feedback and command signals. It differs essentially from the systems of FIGURES 1–3 in utilizing a second gain changer 19' and a second response sensor 12'. The FIGURE 4 system is presented to point out that there are wide variations in the possible choice of signal processing functions. An example of another variant in system configurations is the choice of the adaptively adjusted element, the canceller time constant $T_c$ being an example of another element which can be adjusted. Because a practical control problem is always one of assuming a system model which is only a satisfactory approximation of the actual apparatus which is in fact nonlinear and in fact impossible to analyze exactly, the details of signal processing are subject to infinite variations. However, any flight control system of the class of which FIGURES 1 and 4 are members can generally utilize the self-adaptive damping sensor invention.

While the invention was originally intended for use in high performance aircraft, its use is not so restricted. Flight control systems intended for aircraft use can sometimes be used for missiles, spacecraft, and hydrofoil craft with little or even no change. Frequently, however, substantial modification is desirable in accordance with the particular dynamic characteristics of the vehicle which is normally implemented in conformance with accepted servomechanism principles. The control systems of FIGURES 1–4 are actually pitch control channels for which the corresponding channels for controlling roll, altitude, etc. would be implemented in a manner readily understood by those skilled in the art of automatic control systems. It is considered obvious that any control system, recognized as requiring a servomechanism of the kind of which flight control channels are representatives, can employ the present invention.

Automatic control systems are specialized real-time data processors or computers. The FIGURES 3E–3I schematic diagram presents pulse width circuit apparatus for implementation of the invention. Pulse width circuit systems are basically analog in nature, although particular portions can utilize digital components for operating on and generating pulse width modulated signals. For example, integration can be performed in analog fashion by means of the capacitor 65 which integrates fixed amplitude pulses having variable pulse widths or in a digital fashion by means of a counter which integrates fixed frequency pulses that are gated by the input width signals. As is well known to those skilled in the art, the control system computer apparatus may be selected from the hardware available, from the less expensive analog electro-mechanical components to the more compact digital integrated electronic components.

While particular embodiments of the invention have been shown and described herein, it is not intended that the invention be limited to such disclosure, but that changes and modifications can be made and incorporated within the scope of the claims.

What is claimed is:

1. A vehicle control system comprising:
 (a) circuit means, including a canceller, responsive to applied command signals and feedback signals, for generating a control signal;
 (b) an adjustable electronic gain changer, effectively in series with the output of said means for generating a command signal, for varying the loop gain so as to make the system self-adaptive;
 (c) an electronic damping sensor arranged to employ a portion of the output of said canceller by comparing the current flow during successive half cycles of said portion of output to derive a signal representing the difference between the existing system damping factor and the desired system damping factor, for generating incremental error signals, and
 (d) means responsive to said incremental error signals for adjusting said gain changer.

2. In a self-adaptive flight control system, having signal processing apparatus including a canceller and an adjustable element, of the class normally used for stability augmentation, whereby the vehicle provides substantially constant response characteristics to input command signals, in spite of departures from the nominal design values for system components and environmental conditions, a damping sensor comprising:
 (a) a band-pass filter, for deriving a response signal having a band of mode signal frequencies, from the output of the canceller;
 (b) a pair of weighting integrators, responsive to said mode signals, for comparing successive weighted half cycles to produce incremental error signals from their difference;
 (c) a zero-crossing detector responsive to said response signal;
 (d) a sequence generator, triggered by said zero-crossing detector, for gating and reading-out said integrators; and
 (e) a memory for accumulating said incremental error signals and adjusting the adjustable element in accordance therewith.

3. In a servomechanism control system for a vehicle wherein a control element is operated to control vehicle motion:
 (a) a signal processing circuit, responsive to input motion command signals and to feedback signals, for generating a control signal to be applied to the control element in accordance with the nominal vehicle characteristics;
 (b) an electronic gain changer, interposed between the source of input command signals and the control element, for adapting the system response characteristics to changes from the normal vehicle characteristics;
 (c) signal filter means responsive to the feedback signal for deriving a sinusoidal signal representing a selected mode of response of the vehicle, and
 (d) an integrator circuit responsive to element (c)
  (i) repetitively integrating successive half cycles of the selected mode signal
  (ii) comparing said integrated half cycles
  (iii) generating incremental area error signals responsive to variations in (ii) and
 (e) circuit means responsive to said error signals for adjusting said gain changer.

4. A self-adaptive flight control system, of the class normally used for stability augmentation in aircraft, missiles, and hydrofoil craft, whereby the vehicle provides substantially constant response characteristics to input command signals, in spite of departures from the nominal design values for system components and environmental conditions, comprising:
 (a) signal processing means, including a canceller, responsive to input command signals and feedback signals, for generating a control signal;
 (b) an adjustable gain changer for modifying said control signals;
 (c) an adaptive sensor, for maintaining the system damping factor constant, including:

(1) a filter for deriving a band of mode signal frequencies from the output of said canceller,
(2) a weighting integrator, responsive to said mode signals, for comparing successive weighted half cycles to produce incremental area error signals from their difference, and
(3) a memory for accumulating said incremental error signals and adjusting said gain changer in accordance therewith.

References Cited

UNITED STATES PATENTS

| | | | |
|---|---|---|---|
| 3,105,928 | 10/1963 | Congleton et al. | 318—28 |
| 3,137,458 | 6/1964 | Smith et al. | 244—775 |
| 3,149,270 | 9/1964 | Smyth et al. | 318—28 |
| 3,221,238 | 11/1965 | Unger et al. | 318—489 |
| 3,241,027 | 3/1966 | Albright | 318—489 |

BENJAMIN DOBECK, *Primary Examiner.*